(12) United States Patent
Ikeda

(10) Patent No.: US 11,181,895 B2
(45) Date of Patent: Nov. 23, 2021

(54) WORK ASSISTANCE DEVICE, WORK ASSISTANCE METHOD, AND WORK ASSISTANCE PROGRAM

(71) Applicant: FUJITSU LIMITED, Kawasaki (JP)

(72) Inventor: Hiroshi Ikeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 453 days.

(21) Appl. No.: 16/163,740

(22) Filed: Oct. 18, 2018

(65) Prior Publication Data

US 2019/0049938 A1    Feb. 14, 2019

Related U.S. Application Data

(63) Continuation of application No. PCT/JP2016/063050, filed on Apr. 26, 2016.

(51) Int. Cl.
*G05B 23/02* (2006.01)
*G05B 19/418* (2006.01)

(52) U.S. Cl.
CPC ......... *G05B 23/024* (2013.01); *G05B 19/418* (2013.01); *G05B 19/4184* (2013.01); *G05B 19/4188* (2013.01); *G05B 19/41875* (2013.01); *G05B 23/0286* (2013.01); *G05B 2219/24018* (2013.01); *G05B 2219/24019* (2013.01); *G05B 2219/32233* (2013.01); *Y02P 90/02* (2015.11)

(58) Field of Classification Search
CPC ................ G05B 23/024; G05B 19/418; G05B 23/0286; G05B 19/4184; G05B 19/41875; G05B 19/4188; G05B 2219/24019; G05B 2219/32233; G05B 2219/24018; Y02P 90/02

See application file for complete search history.

(56) References Cited

FOREIGN PATENT DOCUMENTS

| JP | 63-175141 | | 7/1988 | |
|----|-----------|---|--------|---|
| JP | 07-164267 | | 6/1995 | |
| JP | 2004246628 | * | 2/2004 | ............ Y02P 90/02 |
| JP | 2004-246628 | | 9/2004 | |
| JP | 2006-039650 | | 2/2006 | |
| JP | 2010-026725 | | 2/2010 | |

(Continued)

OTHER PUBLICATIONS

WO-2017187511-A1_Translated (Year: 2017).*

(Continued)

*Primary Examiner* — Natalie Huls
*Assistant Examiner* — Michael J Singletary
(74) *Attorney, Agent, or Firm* — Fujitsu Patent Center

(57) ABSTRACT

A work assistance device that assists works for resolving a plurality of problems for simultaneously occurring in a system having a plurality of devices for producing products, the work assistance device including a processor configured to acquire, at occurrence of the plurality of problems, actual historical information on a processing time desired to previously produce the product in each of the devices; perform maximum a posteriori probability estimation of a processing time desired to produce the product in each of the devices, based on prior distribution stored in a storage unit and the acquired actual historical information on the processing time; and determine a work priority order of each of the devices based on the estimated processing times, and output the work priority order.

7 Claims, 12 Drawing Sheets

(56) References Cited

FOREIGN PATENT DOCUMENTS

| JP | 2010026725 | * | 4/2010 | ............ Y02P 90/02 |
| JP | 2011-233154 | | 11/2011 | |
| JP | 2012-043310 | | 3/2012 | |
| JP | 2012-160056 | | 8/2012 | |
| WO | WO-2017187511 A1 | * | 11/2017 | ......... G05B 19/4188 |
| WO | WO-2019003497 A1 | * | 1/2019 | ....... G05B 19/41865 |

OTHER PUBLICATIONS

WO-2019003497-A1_Translated (Year: 2019).*
EESR—Extended European Search Report dated Apr. 3, 2019 for corresponding European Patent Application No. 16900382.9.
International Search Report and Written Opinion of the International Searching Authority, mailed in connection with PCT/JP2016/063050 and dated Jul. 26, 2016 (11 pages), with partial English translation.
EPOA—European Office Action dated Feb. 19, 2021 for corresponding European Patent Application No. 16900382.9.

* cited by examiner

FIG. 5

PRODUCTION PLAN INFORMATION DB52
(FIRST BOARD INFORMATION TABLE 152A)

| MOUNTER LINE | FIGURE NUMBER | BOARD TYPE (VERSION) | NUMBER OF BOARDS | PRODUCTION TIME |
|---|---|---|---|---|
| A | FIGURE NUMBER a | V01 | 50 | 01:40:00 |
| A | FIGURE NUMBER b | V02 | 100 | 01:30:00 |
| B | FIGURE NUMBER c | V03 | 30 | 01:35:00 |
| B | FIGURE NUMBER d | V01 | 40 | 00:55:00 |
| C | FIGURE NUMBER e | V02 | 100 | 01:55:00 |
| C | FIGURE NUMBER f | V03 | 60 | 00:45:00 |
| ⋮ | ⋮ | ⋮ | ⋮ | ⋮ |

(BOARD PROCESSING TIME TABLE 152B)

| BOARD TYPE (VERSION) | MOUNTER LINE | MOUNTER DEVICE NUMBER | PROCESSING TIME PER BOARD | DISTRIBUTION PARAMETER OF PROCESSING TIME PER BOARD | VARIANCE OF PROCESSING TIME PER BOARD |
|---|---|---|---|---|---|
| V01 | A | DEVICE 1 | 120 | 100 | 10 |
| V01 | A | DEVICE 2 | 140 | 130 | 20 |
| V01 | B | DEVICE 1 | 100 | 150 | 25 |
| V01 | B | DEVICE 2 | 150 | 200 | 15 |
| V02 | ⋮ | ⋮ | ⋮ | ⋮ | ⋮ |

(SECOND BOARD INFORMATION TABLE 152C)

| MOUNTER LINE | ORDER IN LINE | FIGURE NUMBER | BOARD TYPE | NUMBER OF BOARDS |
|---|---|---|---|---|
| A | 1 | FIGURE NUMBER a | V01 | 50 |
| A | 2 | FIGURE NUMBER b | V02 | 100 |
| A | 3 | FIGURE NUMBER k | V04 | 200 |
| ⋮ | ⋮ | ⋮ | ⋮ | ⋮ |
| B | 1 | FIGURE NUMBER c | V03 | 30 |
| ⋮ | ⋮ | ⋮ | ⋮ | ⋮ |

FIG. 6

<PRODUCTION STATE INFORMATION DB54>

(PRODUCTION STATE BY FIGURE NUMBER TABLE 154A)

| FIGURE NUMBER | MOUNTER LINE | PRODUCTION START TIME | PRODUCTION COMPLETION TIME |
|---|---|---|---|
| FIGURE NUMBER a | A | 08:00:00 | 09:52:00 |
| FIGURE NUMBER b | A | 09:52:00 | |
| FIGURE NUMBER c | B | 08:23:00 | |
| FIGURE NUMBER d | B | | |
| FIGURE NUMBER e | C | 08:49:00 | |
| FIGURE NUMBER f | C | | |
| ⋮ | ⋮ | ⋮ | ⋮ |

(PRODUCTION STATE BY BOARD TABLE 154B)

| FIGURE NUMBER | BOARD SERIAL NUMBER | MOUNTER LINE | MOUNTER DEVICE NUMBER | PRODUCTION START TIME | PRODUCTION COMPLETION TIME |
|---|---|---|---|---|---|
| FIGURE NUMBER a | a_001 | A | DEVICE 1 | 08:00:00 | 08:02:12 |
| FIGURE NUMBER a | a_001 | A | DEVICE 2 | 08:02:12 | 08:03:23 |
| FIGURE NUMBER a | a_001 | A | | | |
| ⋮ | ⋮ | ⋮ | ⋮ | ⋮ | ⋮ |
| FIGURE NUMBER c | c_002 | B | DEVICE 1 | | |
| ⋮ | ⋮ | ⋮ | ⋮ | ⋮ | ⋮ |

(MOMENTARY STOPPAGE INFORMATION TABLE 154C)

| MOUNTER LINE | MOUNTER DEVICE NUMBER | OCCURRENCE TIME | WORK COMPLETION TIME | CONTENTS |
|---|---|---|---|---|
| A | DEVICE 1 | 09:30:21 | 09:33:55 | COMPONENT SUCTION ERROR |
| B | DEVICE 2 | 10:02:43 | | COMPONENT RECOGNITION ERROR |
| A | DEVICE 3 | 10:02:50 | | COMPONENT SUCTION ERROR |

FIG. 11

| WORK ORDER | MOUNTER LINE | MOUNTER DEVICE NUMBER | MOMENTARY STOPPAGE OCCURRENCE TIME | CONTENTS |
|---|---|---|---|---|
| 1 | B | DEVICE 3 | 10:05:12 | COMPONENT SUCTION ERROR |
| 2 | C | DEVICE 2 | 10:04:50 | COMPONENT RECOGNITION ERROR |

WORK ASSISTANCE DEVICE, WORK ASSISTANCE METHOD, AND WORK ASSISTANCE PROGRAM

CROSS-REFERENCE TO RELATED APPLICATION

This application is a continuation application of International Application PCT/JP2016/063050 filed on Apr. 26, 2016 and designated the U.S., the entire contents of which are incorporated herein by reference.

FIELD

The present application relates to a work assistance device, a work assistance method, and a work assistance program.

BACKGROUND

In production lines such as surface mounting lines or various production apparatuses, preferably, a time when all production plans previously assigned to every production lines or apparatuses are completed (production completion time) is the earliest to the extent possible in terms of cost and deadline.

In the production line, a short-term stoppage or delay may occur suddenly, and the operator has to perform a work for resolving this problem. Such sudden stoppage or delay is also referred to as "momentary stoppage", and a work for resolving the momentary stoppage is referred to as "momentary stoppage work".

Since the momentary stoppage occurs suddenly, a plurality of momentary stoppages may simultaneously occur in a production line or a plurality of production lines. In this case, which momentary stoppage work is to be performed first affects the production completion time. Japanese Laid-open Paten Publication Nos. 2012-160056, 2010-26725, and 2006-39650 disclose techniques of determining the work priority order.

For example, when a plurality of momentary stoppages simultaneously occur in the same line, the highest priority may be assigned to the momentary stoppage of a device that performs a bottleneck step (a step with the lowest productivity), and the execution order may be the decreasing order of effects of the devices when stopped on the bottleneck step. When a plurality of momentary stoppages simultaneously occur in different lines, the execution order may be determined so as to assign a priority to the momentary stoppage work in the line having a later expected production completion time.

SUMMARY

According to one aspect of the embodiments, a work assistance device that assists works for resolving a plurality of problems for simultaneously occurring in a system having a plurality of devices for producing products, the work assistance device including a processor configured to acquire, at occurrence of the plurality of problems, actual historical information on a processing time desired to previously produce the product in each of the devices; perform maximum a posteriori probability estimation of a processing time desired to produce the product in each of the devices, based on prior distribution stored in a storage unit and the acquired actual historical information on the processing time; and determine a work priority order of each of the devices based on the estimated processing times, and output the work priority order.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a table illustrating an example of a data structure of a production plan information DB.

FIG. 6 is a table illustrating an example of a data structure of a production state information DB.

FIG. 11 is a table illustrating a display example.

DESCRIPTION OF EMBODIMENT

In the case where the execution order of the momentary stoppage works is determined as described above, the bottleneck step may be identified based on an expected processing time of each step predetermined in a production plan, and the production completion time in each line may be identified based on the expected processing times.

However, the expected processing time in each step determined in the production plan may deviate from an actual processing time. In actual production, stoppage or delay may occur in each step. For this reason, the bottleneck step or the production completion time in each line may change from the production plan, failing to determine an appropriate work order. A production system according to an embodiment will be described below in detail with reference to FIGS. 1 to 11.

Figure 1:
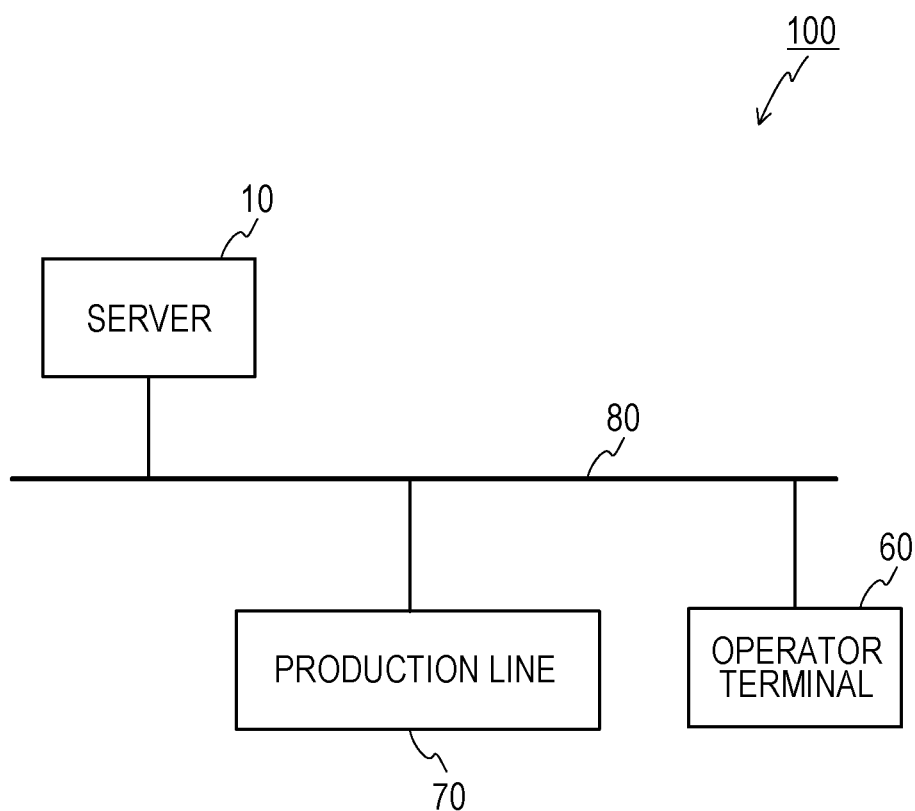
FIG. 1 is a schematic view illustrating a configuration of a production system according to an embodiment.

FIG. 1 schematically illustrates a configuration of a production system 100 according to an embodiment. As illustrated in FIG. 1, the production system 100 according to this embodiment includes a production line 70, a server 10 as a work assistance device, and an operator terminal 60. The production line 70, the server 10, and the operator terminal 60 are connected to a network 80.

Figure 2:
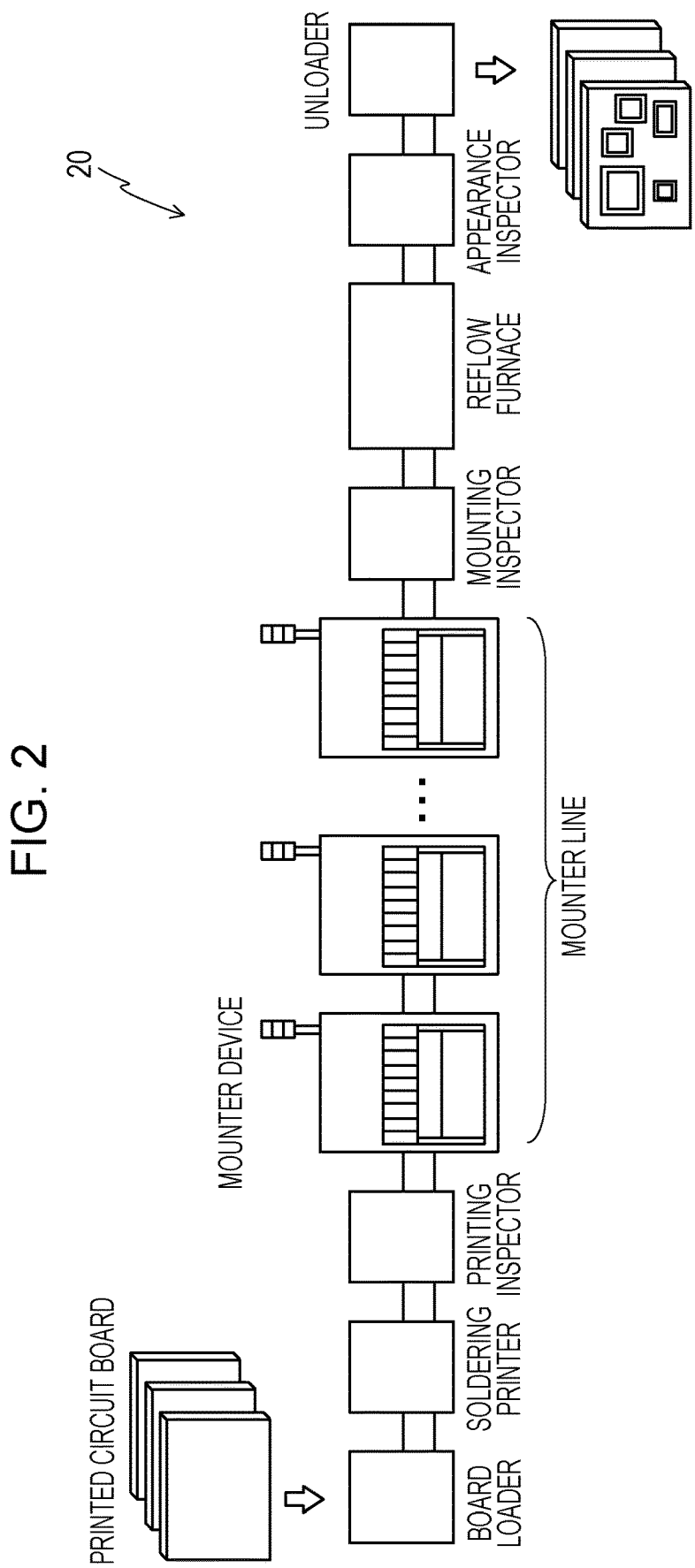
FIG. 2 is a view illustrating a surface mounting line.

As an example, the production line 70 has a plurality of surface mounting lines 20 as illustrated in FIG. 2. The surface mounting line 20 is a line for mounting components on a printed circuit board (hereinafter referred to as merely "board"), and includes a board loader, a soldering printer, a printing inspector, a mounter line, a mounting inspector, a reflow furnace, an appearance inspector, and an unloader. These devices are interconnected via a conveyor. The mounter line has a plurality of mounter devices for mounting components on the board.

The board loader loads the board onto the conveyor. The soldering printer prints a solder at a predetermined position on the board. The printing inspector inspects the solder on the board. The board that has passed an inspection of the printing inspector is conveyed to the mounter line, and in the mounter line, each of the mounter devices surface-mounts a component such as an electronic component on the solder printed on the board. The mounting inspector inspects whether or not any fault exists in the mounting of the component on the board. The reflow furnace applies reflow to the board that has passed the inspection to fix the component to the board. The appearance inspector inspects whether or not any fault exists on the appearance of the board. The unloader takes the board that has passed the inspection out of the conveyor.

The mounter line according to this embodiment is a line in which a buffer for the board is absent between the mounter devices, or only a buffer for storing a few boards is present between the mounter devices. The number of boards processed on the device is one or two. For this reason, when a device behind the device that performs the bottleneck step (the step with lowest productivity) in the mounter line stops, the board processed in the bottleneck step not be conveyed to the next device and thus, the device that performs the bottleneck step may stop. Accordingly, in terms of the production efficiency (reduction of a production time), it is unpreferable to stop the device that performs the bottleneck step or a step preceding the bottleneck step, as well as that the device behind the bottleneck step.

Each of the surface mounting lines 20 of the production line 70 processes figure numbers according to the order predetermined at planning of production. The "figure number" described herein refers to a set (lot) of one or more identical boards consecutively manufactured in the same surface mounting line.

Returning to FIG. 1, the server 10 manages various data acquired from the production line 70, and notifies the production state of the production line 70 to the operator terminal 60. The server 10 notifies the operator's work timing in the production line 70 to the operator terminal 60, thereby assisting the work of the operator.

Figure 3:
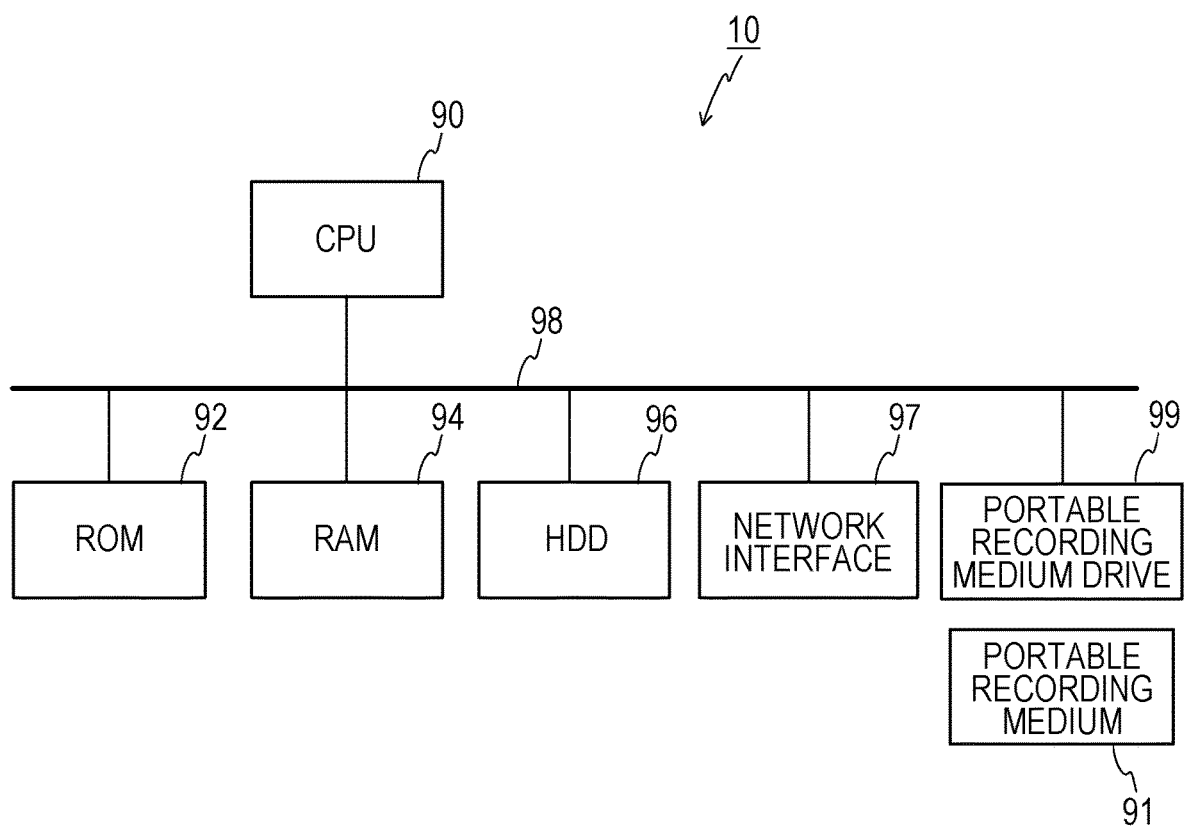
FIG. 3 is a view illustrating a hardware configuration of a server.
Figure 4:
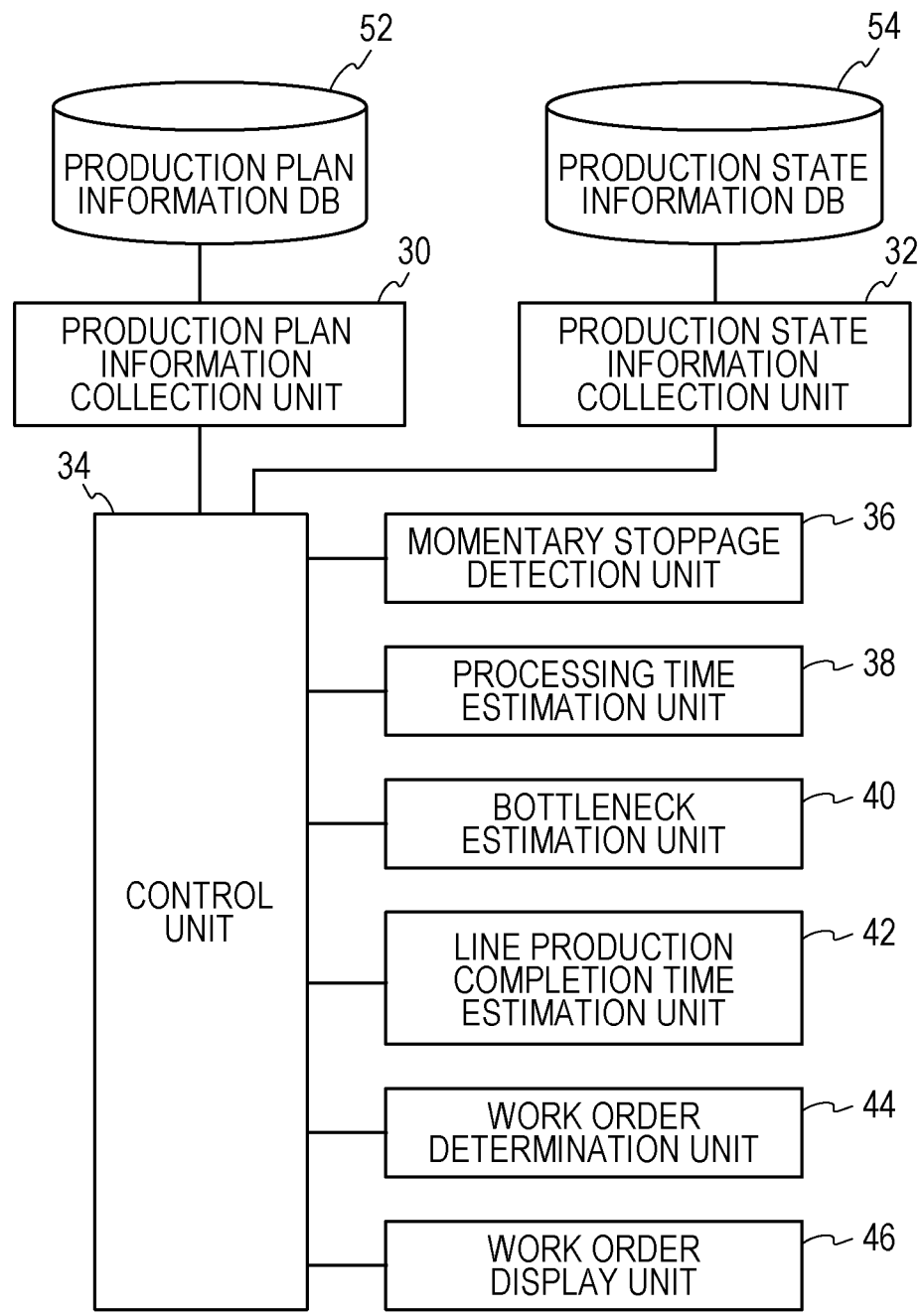
FIG. 4 is a functional block diagram of the server.

FIG. 3 illustrates a hardware configuration of the server 10. As illustrated in FIG. 3, the server 10 includes a CPU (Central Processing Unit) 90, a ROM (Read Only Memory) 92, a RAM (Random Access Memory) 94, a storage unit (including Hard Disk Drive, Flash Memory, Digital Versatile Disc, and Compact Disc, for example)) 96, a network interface 97, and a portable recording medium drive 99. The constituents of the server 10 each are connected to a bus 98. In the server 10, the CPU 90 executes a program (including a work assistance program) stored in the ROM 92 or the HDD 96, or a program (including the work assistance program) read from a portable storage media 91 by the portable recording medium drive 99, thereby performing functions of the constituents in FIG. 4. FIG. 4 also illustrate a production plan information DB (database) 52 and a production state information DB 54 which are stored in the HDD 96 or the like of the server 10.

FIG. 4 is a functional block diagram of the server 10. The CPU 90 executes the program, thereby functioning as a production plan information collection unit 30, a production state information collection unit 32, a control unit 34, a momentary stoppage detection unit 36, a processing time estimation unit 38 as an acquisition unit and an estimation unit, a bottleneck estimation unit 40, a line production completion time estimation unit 42, a work order determination unit 44, and a work order display unit 46, in FIG. 4.

The production plan information collection unit 30 collects production plan information from the production plan information DB 52, and transmits the collected production plan information to the control unit 34. The production plan information includes information on the production plan of each figure number and information on the production of each board. The production plan information DB 52 stores a first board information table 152A, a board processing time table 152B, and a second board information table 152C as illustrated in FIG. 5.

The first board information table 152A is a table that manages information on the mounter line previously used to produce each figure number and information acquired at production. As illustrated in FIG. 5, the first board information table 152A has fields of "mounter line", "figure number", "board type (version)", "number of boards", and "production time". The field "mounter line" stores identification information on the mounter line previously used for production, and the field "figure number" stores identification information on the produced figure number. The field "board type (version)" stores the type (version) of each figure number, the field "number of boards" stores the number of produced boards, and the field "production time" stores time taken for production.

The board processing time table 152B is a table that manages various information prescribed in the production plan. As illustrated in FIG. 5, the board processing time table 152B has fields of "board type (version)", "mounter line", "mounter device number", "processing time per board", "distribution parameter of processing time per board", and "variance of processing time per board". The fields of "board type (version)", "mounter line", and "mounter device number" store information for identifying the type of board, the mounter device in the mounter line, and the processing time. The field "processing time per board" stores processing time per board ($\mu_0$) prescribed in the production plan.

The field "distribution parameter of processing time per board" and "variance of processing time per board" store distribution parameter ($\sigma_0^2$) and variance ($\sigma^2$) per board, respectively, prescribed in the production plan.

The second board information table 152C is a table that manages the production order of figure numbers in each production line 70 (mounter line).

The second board information table 152C has fields of "mounter line", "order in line", "figure number", "board type", and "number of boards". The field "mounter line" stores identification information on the mounter line used for production, and the field "order in line" stores a figure indicating the ordinal number of figure number introduced into the mounter line. The field "figure number" stores identification information on the introduced figure number, the field "board type" stores the board type of figure number, and the field "number of boards" stores the number of produced boards.

Returning to FIG. 4, the production state information collection unit 32 collects production state information from the production state information DB 54, and transmits collected production state information to the control unit 34. The production state information includes information on the production state of each figure number and each board, and information on momentary stoppages occurred in the production line 70. The "momentary stoppage" refers to short-term stoppage or delay suddenly occurred in the mounter device in the production line 70. The operator has to perform the work for resolving such suddenly-occurring phenomenon (momentary stoppage work).

FIG. 6 illustrates a production state by figure number table 154A, a production state by board table 154B, and a momentary stoppage information table 154C in the production state information DB 54.

The production state by figure number table 154A is a table that stores the production state of each figure number, and has fields of "figure number", "mounter line", "production start time", and "production completion time". The field "figure number" stores identification information on the figure number to be produced, and the field "mounter line" stores identification information of the mounter line in which the figure number was produced/is being produced/is produced. The field "production start time" stores a time when production has started, and the field "production completion time" store a time when production has completed. For the figure number that is yet to be produced, the fields "production start time" and "production completion time" are blank, and for the figure number that is being produced, the field "production completion time" is blank.

The production state by board table 154B is a table that stores the production state of each board, and has fields of "figure number", "board serial number", "mounter line", "mounter device number", "production start time", and "production completion time". The fields "figure number" and "board serial number" store information for identifying the board to be produced, and the fields "mounter line" and "mounter device number" store the mounter line and the mounter device number in which the figure number was produced/is being produced/is produced. The fields "production start time" and "production completion time" store a time when the production of the board has started and a time when the production of the board has completed in each mounter device, respectively. For the figure number that is yet to be produced, the fields "production start time" and "production completion time" are blank, and for the figure number that is being produced, the field "production completion time" is blank.

The momentary stoppage information table 154C is a table that stores information on the momentary stoppage, and has fields of "mounter line", "mounter device number", "occurrence time", "work completion time", and "contents". The fields "mounter line" and "mounter device number" store information on the mounter line and the mounter device in which the momentary stoppage occurred. The field "occurrence time" stores information on a time when the momentary stoppage occurred. The field "work completion time" stores information on a time when the operator completed the momentary stoppage work. The field "contents" stores contents of the momentary stoppage (reason for stoppage of the mounter device).

Returning to FIG. 4, the control unit 34 collectively controls each function (each unit) of the server 10. For example, the control unit 34 transmits the data collected by the production plan information collection unit 30 and the production state information collection unit 32 at appropriate timings to the units 36 to 46, or causes the units 36 to 46 to execute processing at appropriate timings.

Based on data collected by the production state information collection unit 32 from the momentary stoppage information table 154C, the momentary stoppage detection unit 36 detects the occurrence of the momentary stoppage. When receiving information indicating that new data is stored in the momentary stoppage information table 154C in FIG. 6, the momentary stoppage detection unit 36 detects the occurrence of the momentary stoppage.

The processing time estimation unit 38 estimates a processing time of steps executed in each mounter device in each surface mounting line 20. Based on an estimation result of the processing time estimation unit 38, the bottleneck estimation unit 40 estimates the bottleneck step of the mounter line included in each of the surface mounting lines 20 (the mounter device corresponding to the bottleneck step).

The line production completion time estimation unit 42 estimates a production completion time of each surface mounting line 20. Based on the estimation results of the bottleneck estimation unit 40 and the line production completion time estimation unit 42, the work order determination unit 44 determines the execution order of works for resolving simultaneously-occurring momentary stoppages (momentary stoppage works). The work order display unit 46 transmits the order (work priority order) determined by the work order determination unit 44 to the operator terminal 60, and causes the operator terminal 60 to display the order thereon.

Returning to FIG. 1, the operator terminal 60 is held by the operator or installed near the production line 70, and is a PC (Personal Computer), a tablet terminal, a smart phone or the like. The operator terminal 60 includes a display, and displays the work order of the momentary stoppage work, which is determined by the server 10, on the display to assist the operator's work.

(Processing of Server 10)

Figure 9:
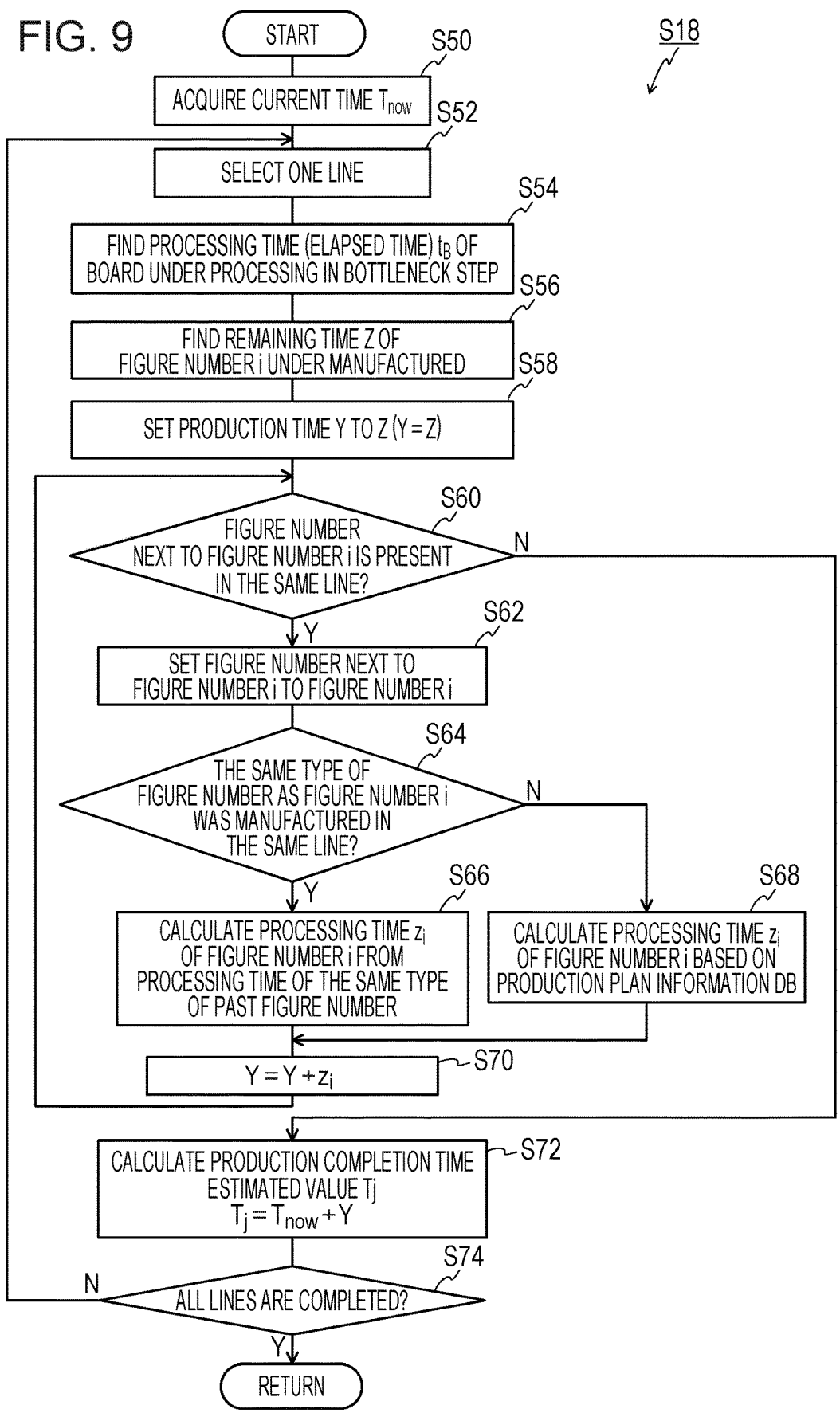
FIG. 9 is a flow chart illustrating specific processing in Step S18 in FIG. 7.

Processing of server 10 will be described below in detail with reference to flow charts in FIGS. 7 and 9. FIG. 9 is a flow chart illustrating specific processing in Step S18 in FIG. 7. In the processing, it is assumed that the number of work resources (operators) that perform the momentary stoppage work in the production line 70 is one (one person).

Figure 7:
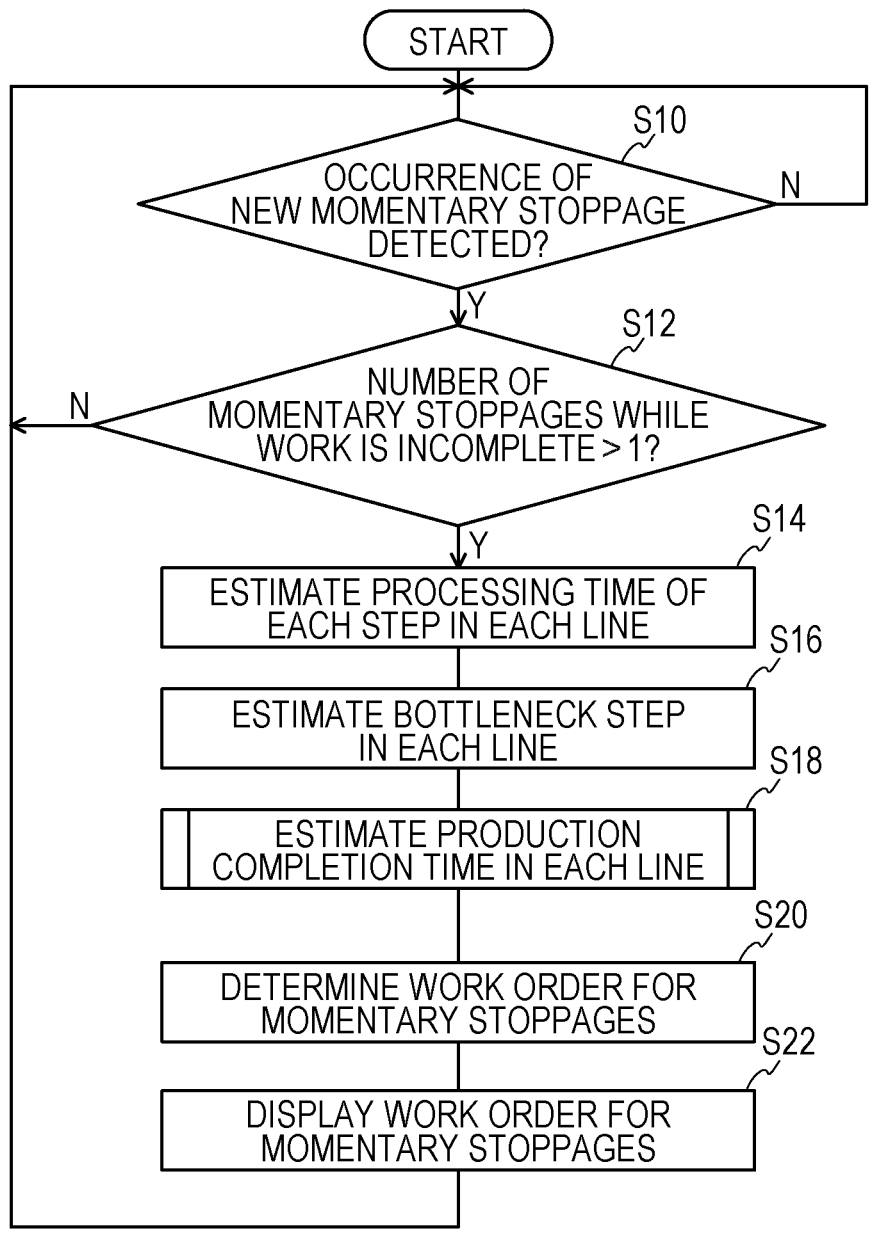
FIG. 7 is a flow chart of processing of the server.

In a flow chart illustrated in FIG. 7, first, in Step S10, the momentary stoppage detection unit 36 waits to detect the occurrence of a new momentary stoppage. In this case, when receiving information indicating that new data is stored in the momentary stoppage information table 154C in FIG. 6 from the production state information collection unit 32, the momentary stoppage detection unit 36 detects the occurrence of the momentary stoppage.

When Yes is selected in Step S10, and the procedure proceeds to Step S12, the momentary stoppage detection unit 36 determines whether or not the number of momentary stoppages for which the work is yet to be completed is larger than 1.

In this case, via the control unit 34 and the production state information collection unit 32, the momentary stoppage detection unit 36 checks whether or not plural pieces of momentary stoppage information, the work completion time of which is not inputted, are present in the momentary stoppage information table 154C in FIG. 6, are present. If there are the plural pieces of momentary stoppage information in which the work completion time is not inputted, Yes is selected in Step S12, and the procedure proceeds to Step S14. On the contrary, if there in only one piece of momentary stoppage information in which the work completion time is not inputted, the procedure returns to Step S10. When the number of work resources (operators) is two or more, in Step S12, it may be determined whether or not the number of momentary stoppages for which the work is yet to be completed is larger than the number of work resources.

When the procedure proceeds to Step S14, the processing time estimation unit 38 estimates the processing time of each step in each surface mounting line 20 (each mounter device). For example, the processing time estimation unit 38 estimates the processing time desired to process one board of the figure number that is being produced (the target figure number) in each step.

A method of estimating the processing time desired to process one board of the target figure number in a particular step (target step) will be described below in detail. According to this embodiment, the processing time estimation unit 38 estimates the processing time of one board in each step by MAP estimation (maximum a posteriori probability estimation). The processing time estimation unit 38 reads a prior distribution of an average value of the processing times based on the processing times in the production plan from the board processing time table 152B in FIG. 5, finds posterior distributions of the processing times based on the prior distribution and observation values of actually observed processing times, and defines the processing time having the maximum posterior distribution as a processing time estimated value.

It is given that the processing time of the target figure number in the target step in the production plan is to, and the prior distribution of the processing times $\mu$ is $p(\mu)=N(\mu|\mu_0, \sigma_0^2)$. $N(\mu|\mu_0, \sigma_0^2)$ is normal distribution of average $\mu_0$ and variance $\sigma_0^2$. $\sigma_0^2$ is empirically given from previous data and so forth. If a guideline for $\sigma_0^2$ such as previous data is absent, $\sigma_0^2$ is set to a value that is sufficiently larger than to $\mu_0$. According to this embodiment, $\mu_0$ is a value inputted to the field "processing time per board" in the board processing time table 152B in FIG. 5, and $\sigma_0^2$ is a value inputted to the field "distribution parameter of processing time per board" in the board processing time table 152B in FIG. 5.

n observation values of the processing time of the target figure number in the target step are expressed as $X_1, X_2, \ldots, X_n$. It is assumed that the observation value X of processing time is a difference between the "production completion time" and the "production start time" in the production state by board table 154B in FIG. 6, and the observation value X independently follows $p(X|\mu)=N(X|\mu, \sigma^2)$. $\sigma^2$ is empirically given from previous data and so forth, and in this embodiment, is a value in the field "variance of processing time per board" in the board processing time table 152B in FIG. 5. However, a sample variance of $X_1, X_2, \ldots, X_n$ may be used as $\sigma^2$.

According to this embodiment, the posterior distribution $p(\mu|X_1, X_2, \ldots, X_n)$ of t may be expressed based on the prior distribution and the observation values $X_1, X_2, \ldots, X_n$ by Bayes' theorem according to a following equation (1).

[Equation 1]

$$p(\mu | X_1, \ldots, X_n) \propto p(X_1, \ldots, X_n | \mu)p(\mu) = \prod_{i=1}^{n} p(X_1 | \mu)p(\mu) \quad (1)$$

According to this embodiment, since the processing time having the maximum posterior distribution is defined as the processing time estimated value,

[Equation 2]

$$\prod_{i=1}^{n} p(X_1 | \mu)p(\mu)$$

a logarithm of the above equation may be taken to find $\mu$ that satisfies K=0 in an equation K acquired by differentiation with $\mu$. Given the found $\mu$ is $\mu_{MAP}$, a following equation (2) holds.

[Equation 3]

$$\mu_{MAP} = \frac{\sigma^2}{n\sigma_0^2 + \sigma^2}\mu_0 + \frac{\sigma_0^2}{n\sigma_0^2 + \sigma^2}\sum_{i=1}^{n} X_n \quad (2)$$

According to this embodiment, $\mu_{MAP}$ in the above equation (2) is defined as the processing time estimated value of the target figure number in the target step. In Step S14, using all steps as target steps, the above-mentioned processing time estimation processing is executed.

Figure 8A:
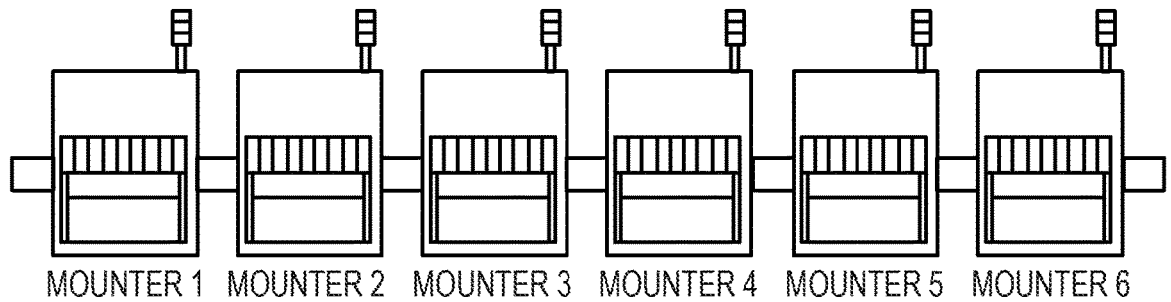
FIG. 8A to 8C are views for describing the effect of predicting processing time (1).
Figure 8B:
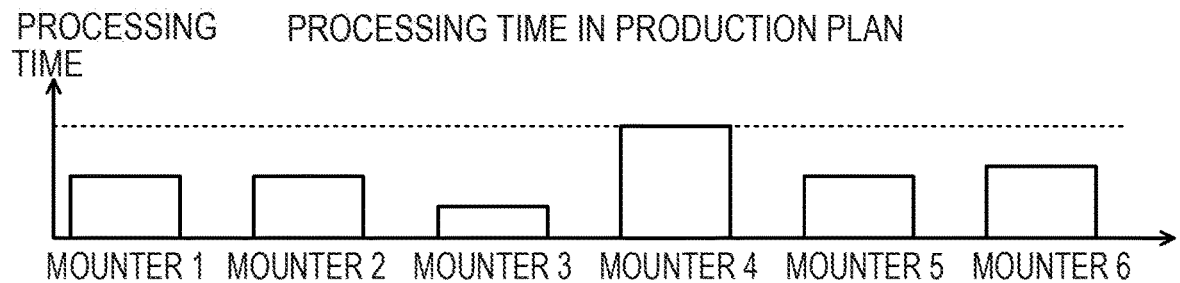
Figure 8C:
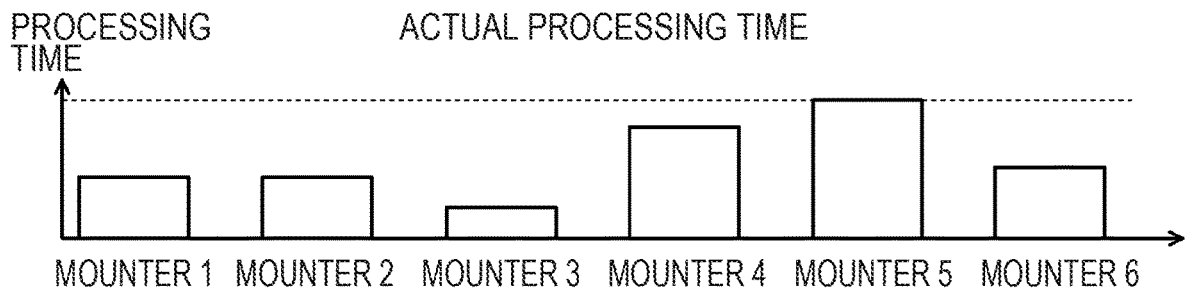

When the processing time of the target figure number in each target step is estimated as described above in Step S14, the procedure proceeds to Step S16, the bottleneck estimation unit 40 estimates the bottleneck step in each surface mounting line 20. Here, the bottleneck estimation unit 40 estimates the step having the longest processing time in each surface mounting line 20 as the bottleneck step. For example, as illustrated in FIG. 8A, six mounter devices (mounter 1 to mounter 6) are present in the mounter line, and FIG. 8B illustrates processing times (expected processing times) in the mounter devices, which is prescribed in the production plan. In the case of estimating the bottleneck step based on the processing times in FIG. 8B, the mounter 4 is estimated as the bottleneck step. On the contrary, in the case of estimating the bottleneck step based on actual processing times in the steps as in this embodiment (see FIG. 8C), the mounter 5 is estimated as the bottleneck step. Even when the estimated processing time is different from the expected processing time (FIG. 8B), the bottleneck step may be appropriately estimated.

Returning to FIG. 7, in next Step S18, the line production completion time estimation unit 42 executes processing of estimating the production completion time in each line. The processing In Step S18 is executed according to a flow chart in FIG. 9.

In the processing in FIG. 9, first, in Step S50, the line production completion time estimation unit 42 acquires a current time $T_{now}$.

Next, in Step S52, the line production completion time estimation unit 42 select one surface mounting line 20. Next, in Step S54, the line production completion time estimation unit 42 finds the processing time (elapsed time) $t_B$ of the board that is being processed in the bottleneck step. In this case, the elapsed time $t_B$ may be found by a following equation (3).

$$t_B = T_{now} - \text{production start time} \quad (3)$$

Next, in Step S56, line production completion time estimation unit 42 finds a remaining time Z of the figure number i under production. Given that the number of boards for which processing of the figure number i that is being produced in the bottleneck step has not started is m, the remaining time Z may be found by a following equation (4).

$$Z = |\mu_B - t_B| + \mu_B \times m \quad (4)$$

$\mu_B$ in the above equation (4) is $\mu_{MAP}$ calculated in Step S14. The number of boards m is a difference between the number of boards stored in the first board information table 152A in FIG. 5 and the number of processed boards counted from the production state by board table 154B in FIG. 6.

Next, in Step S58, the line production completion time estimation unit 42 sets the production time Y to Z (Y=Z).

Next, in Step S60, the line production completion time estimation unit 42 determines whether or not a figure number next to the figure number i in the same surface mounting line 20 is present. If Yes is selected in Step S60, the procedure proceeds to Step S62, and the line production completion time estimation unit 42 sets the figure number next to the figure number i to figure number i. Here, the line production completion time estimation unit 42 refers to the second board information table 152C in FIG. 5 to identify the next figure number.

Next, in Step S64, the line production completion time estimation unit 42 determines whether or not the same type of figure number as the figure number i has been produced in the same line. The same type of figure number as the figure number i may be identified from the second board information table 152C and the first board information table 152A in FIG. 5. Accordingly, the line production completion time estimation unit 42 determines whether or not the same type of figure number as the figure number i has been produced in the same line from the production state by figure number table 154A. If Yes is selected in Step S64, the procedure proceeds to Step S66. On the contrary, if No is selected in Step S64, the procedure proceeds to Step S68.

If the same type of figure number has been produced in the same line (S64: Yes), and the procedure proceeds to Step S66, the line production completion time estimation unit 42 calculates processing time $z_i$ of figure number i from previous processing time of the same type of figure number. In this case, the line production completion time estimation unit 42 finds processing time zi from a following equation (5) using processing time $\mu_B$ for one board, which is acquired by dividing production time (in the above example, 01:30:00) by the number of boards (100) in the first board information table 152A, and the number of boards q of figure number i. The number of boards q may be acquired from the field "number of boards" in the first board information table 152A.

$$z_i = \mu_B \times q \quad (5)$$

When the processing in Step S66 is executed as described above, the procedure proceeds to Step S70.

On the contrary, if No is selected in Step S64, and the procedure proceeds to Step S68, the line production completion time estimation unit 42 calculates the processing time $z_i$ of the figure number i based on the production plan information DB 52. For example, referring to the board processing time table 152B, the line production completion time estimation unit 42 acquires the "processing time per board" $\mu_0$ corresponding to the board type of figure number i, the used mounter line, and the mounter device with the bottleneck step. Then, the processing time zi is found using the acquired processing time per board $\mu_0$ and the number of boards q of the figure number i according to a following equation (6).

$$z_i = \mu_0 \times q \quad (6)$$

When the processing in Step S68 is executed as described above, the procedure proceeds to Step S70.

When the processing in Step S66 or S68 is executed, and the procedure proceeds to Step S70, the line production completion time estimation unit 42 updates the production time Y to Y+$z_i$ (Y=Y+$z_i$). After that, the procedure returns to Step S60.

Hereinafter, until No is selected in Step S60, processing and determination in Steps S60 to S70 is repeated. Then, if No is selected in Step S60, the procedure proceeds to Step S72. It is noted that in the stage Step S72, a sum of the processing time of the figure number that is being produced and the processing times of one or more figure numbers following the figure number that is being produced is found as the production time Y.

When the procedure proceeds to Step S72, the line production completion time estimation unit 42 calculates an estimated value $T_j$ of the production completion time according to a following equation (7).

$$T_j = T_{now} + Y \quad (7)$$

Next, in Step S74, the line production completion time estimation unit 42 determines whether or not all lines have been selected. If No is selected in Step S74, the line production completion time estimation unit 42 returns to Step S52, and performs processing and determination in steps following Step S52 to calculate the estimated value of the production completion time in the next surface mounting line 20. Then, if Yes is selected in Step S74, all of the processing in FIG. 9 is completed, and the procedure proceeds to Step S20 in FIG. 7.

Figure 10A:
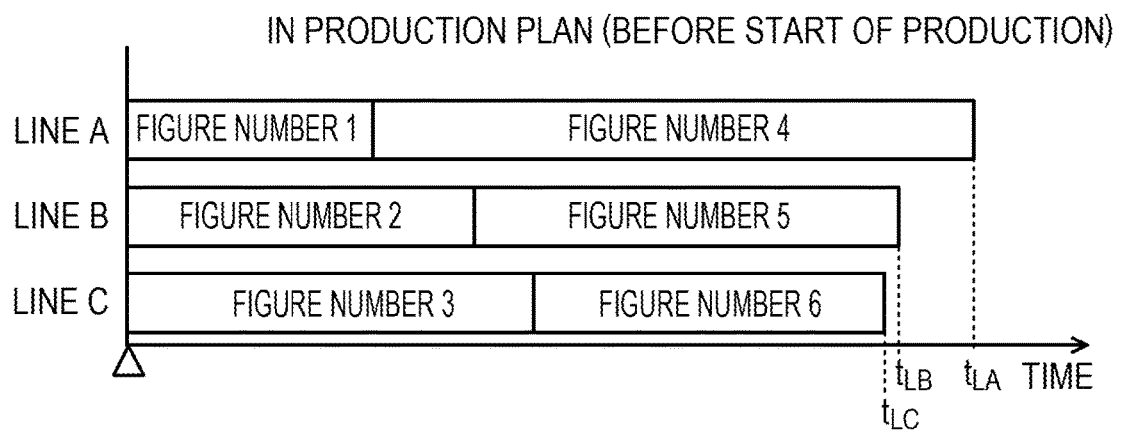
FIGS. 10A and 10B are views for describing the effect of predicting processing time (2).
Figure 10B:
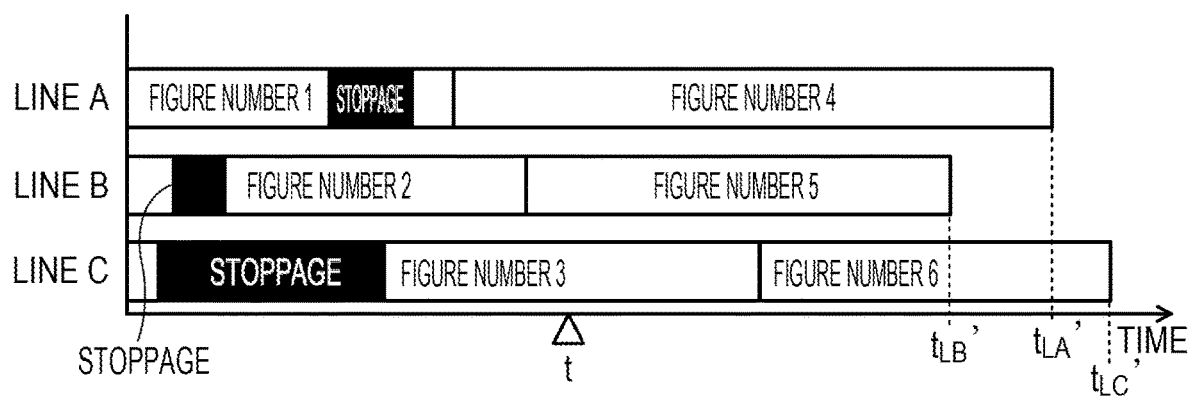

Here, it is assumed that production completion times of a plurality of surface mounting lines 20 is calculated using processing time prescribed in the production plan, and production completion times $t_{LA}$, $t_{LB}$, and $t_{LC}$ as illustrated in FIG. 10A are calculated. In this case, when going to time t, production in each line may not progress as planned due to the occurrence of momentary stoppage or the like. In addition, the production time per board may deviate from the plan. As a countermeasure for this, according to this embodiment, as illustrated in FIG. 10B, when production goes to the time t, processing time after the time t may be estimated based on the past production history to estimate more appropriate production completion times $t_{LA}'$, $t_{LB}'$, and $t_{LC}'$ of figure numbers.

Returning to FIG. 7, when the procedure proceeds to Step S20, the work order determination unit 44 determines the work order of momentary stoppage works. For example, the work order determination unit 44 determines the work order of the momentary stoppage works based on the priority order of steps. The priority order of steps is determined from the estimation result of the bottleneck step in each surface mounting line, which is estimated in Step S16, and the production completion time in each line, which is estimated in Step S18.

Here, in determining the work order of steps, a higher priority is assigned to the priority order in different lines than the priority order in the same line. The priority order in different lines is set to the order of decreasing production completion time. For the priority order in the same line, the device that performs the bottleneck step is determined as the first device, the device immediately ahead of the first device is determined as the second device, the device immediately behind the first device is determined as the third device, the device ahead of the first device by two is determined as the fourth device, the device behind the first device by two is determined as the fifth device, and so on. When the device next to the bottleneck step stops, the device that performs the bottleneck step may stop. In consideration of such particular circumstance in the mounter line, the priority order in the same line is determined as described above. In the case where a buffer for storing a certain number of boards is provided between mounter devices, the priority order in the same line may be determined such that the device that performs the bottleneck step is defined as the first device, the device immediately ahead of the first device is defined as the second device, the device ahead of the first device by two is defined as the third device, the device ahead of the first device by three is defined as the fourth device, and so on.

Then, the work order determination unit 44 determines the priority order (the ordinal order) of a plurality of mounter devices in which the momentary stoppages are generated as the work order of momentary stoppage works.

Next, in Step S22, the work order display unit 46 transmits information on the work order of momentary stoppage works to the operator terminal 60, to cause the operator terminal 60 to display the work order of momentary stoppage works determined in Step S20.

In this case, for example, a display unit of the operator terminal 60 displays the work order of momentary stoppage works as illustrated in FIG. 11.

Thus, the operator may execute the work for resolving the momentary stoppages in order of decreasing priorities.

This preferably reduces the effect of the stoppage of devices due to the momentary stoppage work on the production completion time.

According to this embodiment, the work order determination unit 44 and the work order display unit 46 function as a determination unit that determines the work priority order of the momentary stoppage works and output the work priority order.

As has been described in detail, according to this embodiment, in the case where a plurality of momentary stoppages occurs in the production line 70 for producing the boards, at the occurrence of the plurality of problems, the figure numbers produced in the surface mounting lines 20 are identified. The observation values $X_1 \ldots X_n$ of the processing times desired to produce the identified figure numbers when the figure numbers were previously produced in the devices in each of the surface mounting lines 20 are acquired. MAP estimation of the processing times desired to produce the identified figure numbers in the devices in each of the surface mounting lines 20 is performed based on the prior distribution $(\mu)=N(\mu|\mu_0, \sigma_0^2)$ stored in the production plan information DB 52 (board processing time table 152B) and the acquired observation values $X_1 \ldots X_n$ of the processing times. Then, the work priority order of the devices is determined based on the estimated processing times, and the determined work priority order is outputted.

In this manner, according to this embodiment, the processing times may be accurately estimated based on the observation values of the processing times of the same figure number as the figure number that is being produced and the prior distribution.

The bottleneck step in each of the surface mounting lines 20 and the production completion time in each of the surface mounting lines 20 may be estimated using the accurately estimated processing times, to appropriately determine the priority order of the plurality of momentary stoppage works.

The operator may execute the momentary stoppage works according to the priority order determined in the server 10 to improve the production efficiency of the production line 70.

For example, in the case where one momentary stoppage occurs once per 30 seconds in an entire factory, one momentary stoppage work requests a work time of 90 seconds, and four operators performs the momentary stoppage works, 70 seconds on average elapses from the occurrence of the momentary stoppage to the start of the work.

When the bottleneck step is not properly identified (the case illustrated in FIG. 8B), if the momentary stoppage work is performed unintentionally, the bottleneck step like the other steps is left unattended for 70 seconds on average.

On the contrary, by appropriately determining the order of the momentary stoppage works as in this embodiment, the momentary stoppage work for the bottleneck step is preferentially performed.

In this case, given that the unattended time of the bottleneck step is decreased from 70 seconds to 20 seconds, the stop time of the bottleneck step due to the momentary stoppage decreases by 70%.

This reduces the lowering of productivity due to the momentary stoppage by 70%, suppressing a delay of the production completion time.

According to this embodiment, in the case where the production line 70 has the surface mounting line 20 in which a plurality of devices sequentially perform works for producing the figure number, the device having the longest processing time desired to produce the identified figure number (bottleneck device) among the devices included in the production line 70 is determined in a first device in the work priority order in the production line, and the work priority order of second and subsequent devices is determined in the decreasing order of effects of device when stopped on the bottleneck device.

In this manner, the priority order of the momentary stoppage works in each of the devices may be appropriately determined so as to advance the production completion time in the surface mounting line 20.

According to this embodiment, in the case where a buffer for storing the boards is not provided between the mounter devices in the surface mounting line 20 or a buffer for storing boards less than a predetermined number is provided between the mounter devices in the surface mounting line 20, the work order determination unit 44 determines the device having the longest processing time desired to produce the identified figure number (bottleneck device) as a first device in the work priority order, and the work priority order of second and subsequent devices is determined in the order of the device immediately ahead of the bottleneck device, the device immediately behind the bottleneck device, the device ahead of the bottleneck device by two, the device behind the bottleneck device by two, . . . the device ahead of the bottleneck device by n, the device behind the bottleneck device by n.

In this manner, in the case where no buffer is provided or a buffer for storing only a few boards is provided between the mounter devices, the work priority order may be appropriately determined.

According to this embodiment, in the case where the production line 70 has the plurality of surface mounting lines 20, the production completion times of the plurality of surface mounting lines 20 are estimated based on the estimated processing times, and the work priority order is determined from the devices included in the surface mounting line 20 having the later estimated production completion time.

In this manner, in the case where the plurality of surface mounting lines 20 are present, the work priority order may be determined so as to advance the production completion time.

According to the above-described embodiment, the production line 70 has the plurality of surface mounting lines 20 and however, the embodiment is not limited to this, and the production line 70 may have only one surface mounting line 20.

Also in this case, the production efficiency of the production line 70 may be improved by identifying the bottleneck device based on the estimated processing times, and determining the work priority order.

According to the above-described embodiment, in FIG. 7, when a plurality of momentary stoppages simultaneously occur (S12: Yes), the processing in Steps S14 to S18 is executed and however, the embodiment is not limited to this.

For example, the processing in Steps S14 to S18 may be executed every predetermined time.

In this case, when a plurality of momentary stoppages simultaneously occur, Steps S20 and S22 may be executed based on the latest estimation results acquired in Steps S14 to S18.

According to the above-described embodiment, one server 10 executes the processing in FIGS. 7 and 9 and however, the embodiment is not limited to this.

For example, a plurality of servers may be provided, and processing related to the production plan, processing of determining the momentary stoppage work order, and processing of managing production, and so on may be assigned to respective servers.

Figure 12:
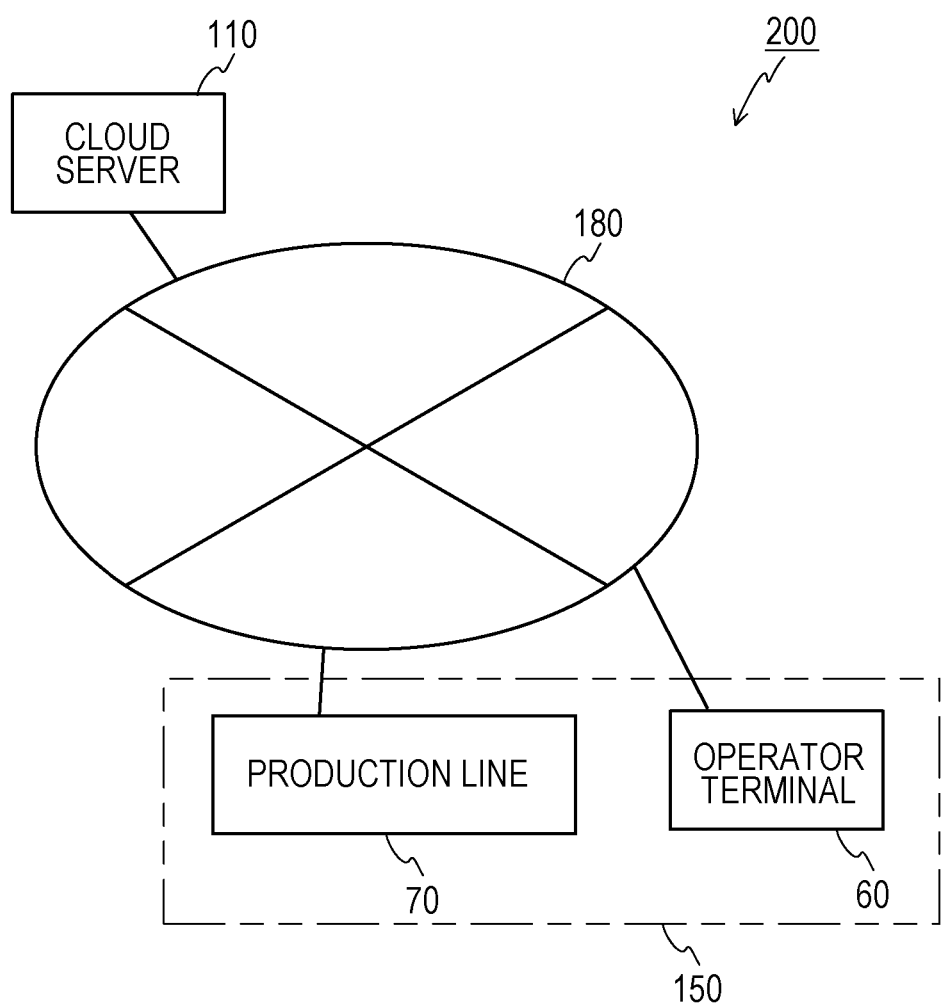
FIG. 12 is a view illustrating a modification example.

The server 10 may be an on-premise embodiment managed in a company or the like owning the production line 70 as in the above-described embodiment (FIG. 1), or may be a cloud server as in a production system 200 illustrated in FIG. 12.

A cloud server 110 in FIG. 12 acquires data transmitted from the production line 70 in a factory 150 via a network 180, processes the data, and transmits a processing result to the operator terminal 60.

The cloud server 110 and the factory 150 may be separately located in different countries.

The above-mentioned processing may be executed using a computer.

In this case, a program that describes processing contents to be performed by functions of a processor is provided.

Each time the server computer transfers the program, the computer may execute processing according to the received program.

The program that describes the processing contents may be recorded in a computer-readable recording medium (however, except for carrier wave).

To distribute the program, for example, the program is sold in the form of a portable recording medium such as DVD (Digital Versatile Disc) and CD-ROM (Compact Disc Read Only Memory) that records the program therein.

The program may be stored in a storage device of a server computer, and the program may be transferred from the server computer to another computer.

The computer that executes the program stores the program recorded in a portable recording medium or the program transferred from the server computer in a storage device of its own.

Then, the computer reads the program from the storage device of its own, and executes processing according to the program.

The computer may also read the program directly from the portable recording medium, and execute processing according to the program.

Each time the server computer transfers the program, the computer may execute processing according to the received program.

The above-described embodiment is a preferred embodiment of the embodiment. However, the embodiment is not limited to this embodiment, and may be variously modified within the subject matter of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A work assistance device that assists resolution of momentary stoppages simultaneously occurring in a system having a plurality of devices for producing products, the work assistance device comprising:
    a memory configured to store a prior distribution of a processing time desired to produce a product in each of the devices in a production plan; and
    a processor configured to
    acquire, at occurrence of the momentary stoppages, historical information on a processing time to previously produce the product in each of the devices;
    perform maximum a posteriori probability estimation of the processing time desired to produce the product in each of the devices, based on the prior distribution stored in the memory and the acquired historical information on the processing time;
    determine, in response to the momentary stoppages, a work priority order of a momentary stoppage work based on the estimated processing times; and
    execute the momentary stoppage work according to the work priority order based on an estimation result of a bottleneck step in a work line for producing products and a production completion time in the work line, wherein
    when the work line is configured to sequentially execute a work for producing the products in the plurality of devices, the processor determines the device having a longest estimated processing time among the devices included in the work line as a first device in the work priority order in the work line, and determines the work priority order of second and subsequent devices in the decreasing order of effects of the devices when stopped on the first device, and
    between the plurality of devices, a buffer for storing the products is not provided, or a buffer capable of storing the products less than a predetermined number of products is provided, and
    the processor determines the device having the longest estimated processing time among the devices included in the work line as the first device in the work priority order in the work line, and determines the work priority order of the second and subsequent devices in the order of the device immediately ahead of the first device, the device immediately behind the first device, the device ahead of the first device by two, the device behind the first device by two, . . . the device ahead of the first device by n, the device behind the first device by n.

2. The work assistance device of claim 1, wherein
    when the system has a plurality of work lines, the processor estimates a production plan completion time of each of the plurality of work lines by using the estimated processing times, and determines the work priority order from the devices included in the work line having a later estimated production plan completion time.

3. The work assistance device of claim 2, wherein
    the processor estimates the processing time of the product that is yet to be produced in each of the plurality of work lines, based on actual historical information on the processing time of a product that is similar to the unproduced product, to estimate the production plan completion time of each of the plurality of work lines.

4. A work assistance method that assists resolution of momentary stoppages simultaneously occurring in a system having a plurality of devices for producing products, the work assistance method causing a computer to execute a process, the process comprising:
  acquiring, at occurrence of the momentary stoppages, historical information on a processing time to previously produce the product in each of the devices;
  performing maximum a posteriori probability estimation of the processing time desired to produce the product in each of the devices, based on the prior distribution stored in the memory and the acquired historical information on the processing time;
  determining, in response to the momentary stoppages, a work priority order of a momentary stoppage work based on the estimated processing times; and
  executing the momentary stoppage work according to the work priority order based on an estimation result of a bottleneck step in a work line for producing products and a production completion time in the work line, wherein
  when the work line is configured to sequentially execute a work for producing the products in the plurality of devices,
  in the determining and outputting processing, the device having the longest estimated processing time among the devices included in the work line is determined as a first device in the work priority order in the work line, and the work priority order of second and subsequent devices is determined in the decreasing order of effects of the devices when stopped on the first device, and
  between the plurality of devices, a buffer for storing the products is not provided, or a buffer capable of storing the products less than a predetermined number is provided, and
  in the determining and outputting, the device having the longest estimated processing time among the devices included in the work line as the first device in the work priority order in the line, and determines the work priority order of the second and subsequent devices in the sequential order of the device immediately ahead of the first device, the device immediately behind the first device, the device ahead of the first device by two, the device behind the first device by two, . . . the device ahead of the first device by n, the device behind the first device by n.

5. The work assistance method of claim 4, wherein
  when the system has a plurality of work lines, the processor estimates a production plan completion time of each of the plurality of work lines by using the estimated processing times, and determines the work priority order from the devices included in the work line having a later estimated production plan completion time.

6. The work assistance method of claim 5, wherein
  in the determining and outputting processing, the processing time of the product that is yet to be produced in each of the plurality of work lines, based on actual historical information on the processing time of a product that is similar to the unproduced product, to estimate the production plan completion time of each of the plurality of work lines.

7. A non-transitory computer-readable recording medium storing therein a program that assists resolution of momentary stoppages simultaneously occurring in a system having a plurality of devices for producing products, the work assistance program causing a computer to execute a process, the process comprising:
  acquiring, at occurrence of the momentary stoppages, historical information on a processing time to previously produce the product in each of the devices;
  performing maximum a posteriori probability estimation of the processing time desired to produce the product in each of the devices, based on the prior distribution stored in the memory and the acquired historical information on the processing time;
  determining, in response to the momentary stoppages, a work priority order of a momentary stoppage work based on the estimated processing times; and
  executing the momentary stoppage work according to the work priority order based on an estimation result of a bottleneck step in a work line for producing products and a production completion time in the work line, wherein
  when the work line is configured to sequentially execute a work for producing the products in the plurality of devices,
  in the determining and outputting processing, the device having the longest estimated processing time among the devices included in the work line is determined as a first device in the work priority order in the work line, and the work priority order of second and subsequent devices is determined in the decreasing order of effects of the devices when stopped on the first device, and
  between the plurality of devices, a buffer for storing the products is not provided, or a buffer capable of storing the products less than a predetermined number is provided, and
  in the determining and outputting, the device having the longest estimated processing time among the devices included in the work line as the first device in the work priority order in the line, and determines the work priority order of the second and subsequent devices in the sequential order of the device immediately ahead of the first device, the device immediately behind the first device, the device ahead of the first device by two, the device behind the first device by two, . . . the device ahead of the first device by n, the device behind the first device by n.

* * * * *